United States Patent [19]

Annacchino et al.

[11] Patent Number: 4,967,887
[45] Date of Patent: Nov. 6, 1990

[54] SOFT START COUPLING

[75] Inventors: Marc A. Annacchino, Greenfield; Wayne R. Walcott, Hartland, both of Wis.

[73] Assignee: The Foxboro Company, Foxboro, Mass.

[21] Appl. No.: 348,399

[22] Filed: May 8, 1989

[51] Int. Cl.⁵ .............................................. F16D 37/02
[52] U.S. Cl. ................................ 192/21.5; 192/84 R; 192/82 T; 192/103 R; 310/78
[58] Field of Search ............... 192/0.03, 0.033, 21.5, 192/84 R, 103 R, 0.02 R, 82 T; 310/92, 95, 78, 102 A

[56] References Cited

U.S. PATENT DOCUMENTS

| | | | |
|---|---|---|---|
| 1,861,180 | 5/1932 | Grob | 192/84 R |
| 2,411,122 | 11/1946 | Winther | 192/103 R |
| 2,718,157 | 9/1955 | Schaub | 192/21.5 X |
| 2,732,921 | 1/1956 | Rabinow | 192/21.5 |
| 2,890,774 | 6/1959 | Parker | 192/21.5 |
| 3,363,143 | 1/1968 | Cavanaugh | 361/100 |
| 3,573,580 | 4/1971 | Shinozaki | 318/227 |
| 3,989,129 | 11/1976 | Brandenstein | 192/84 R |
| 4,469,998 | 9/1984 | Nola | 318/729 |
| 4,510,422 | 4/1985 | Ogura | 318/254 |
| 4,567,975 | 2/1986 | Roll | 192/84 C |
| 4,749,073 | 6/1988 | Olsen | 192/52 |

Primary Examiner—Richard Lorence
Attorney, Agent, or Firm—Foley and Lardner

[57] ABSTRACT

A soft start, self-powered coupling for connecting a motor to a load, the coupling including a magnetic particle clutch, a generator having a rotor carried by the clutch and a stator, and an electronic control circuit assembly carried by the generator rotor, the magnetic particle clutch being connector to the motor and to the load, the generator powering the electronic control circuit assembly and the clutch to provide linear timed acceleration of the load.

14 Claims, 3 Drawing Sheets

SOFT START COUPLING

BACKGROUND OF THE INVENTION

1 Field of the Invention

The present invention relates to a soft start coupling device which allows a motor to accelerate a load in a controlled fashion and, more particularly, to a coupling device wherein the dynamic characteristic of the load acceleration is consistant regardless of the type of load or changes in the load being accelerated.

2 Description of the Prior Art

Smooth start and torque control of motors for driven applications has been recognized as a need by the industry. The most common method employed has been with mechanical devices such as clutches, transmissions, fluidics, etc. for most drive applications. Mechanical technology has its place in industry but the cost to performance ratio of these methods continues to be relatively high. Electrical methods have also been utilized in solid state reduced voltage starters and to a lesser degree, AC variable frequency drives. The electrical technology has satisfied the market need for soft start utilizing solid state reduced voltage starters however, the cost of this technology remains disproportionately high at the lower horse power level. This is due to the cost contribution of electrical applications which is dominated by the price of SCR's, firing circuits, heat sinks, packaging, terminations, and thermal issues.

One of the primary objects of the invention, therefore, is to provide a higher performance soft start coupling at a low cost.

A further object of the invention is to provide a highly reliable device which sits at the motor/load interface and transfers torque in a controlled, predictable, repeatable transition, regardless of the load characteristics.

SUMMARY OF THE INVENTION

The present invention relates to a soft start coupling which is connected at the motor/load interface of low horsepower motors, i.e. less than ten (10) horsepower. Load acceleration from 0 rpm to synchronous rpm can be achieved in a linear fashion by the soft start coupling of the present invention. This occurs regardless of load changes and/or abrupt load transitions. The acceleration time can be adjusted from a two (2) second minimum to forty-five (45) seconds or more depending upon the requirements of the system.

This has been accomplished in the present invention by connecting a magnetic particle clutch between the motor and the load. The casing of the magnetic clutch is connected to the motor drive shaft. The rotor or disc of the magnetic particle clutch is connected to the load. The casing is connected to the rotor by magnetic particles to provide linear timed acceleration of the load by the progressive engagement of the casing and rotor. The magnetic particle clutch is controlled by an electronic circuit which is housed in the rotor of a permanent magnet generator. The rotor of the generator is carried by the magnetic particle clutch casing. The generator produces an output voltage to power the electronic control circuit assembly which generates its own reference ramp to provide linear timed acceleration of the load up to the speed of the motor.

One of the primary features of the invention is the provision for self-powering of the coupling. This is accomplished by housing an electronic control circuit assembly in the coupling. The electronics are carried by the rotor of the generator which in turn is carried by the magnetic particle clutch casing thus requiring fewer parts, i.e. no brushes, slip rings or other means to transfer power or signals from a stationary object to a rotary object. The low cost is attributed to the overall configuration of the coupling.

One of the primary advantages of the soft start coupling is the ease of retrofit installation since no motor control circuit revisions are required thereby reducing installation time and cost.

Another advantage of using a self-contained electronic assembly is the higher reliability which can be achieved from the overall coupling.

Another advantage of this invention is the elimination of the need for expensive electrical slip rings between the rotating and non-rotating parts.

A further advantage of this invention is the high reliability achieved by the elimination of relative rotations between electronic elements.

Other principal features and advantages of the invention will become apparent to those skilled in the art upon review of the following detailed description, claims and drawings.

DETAILED DESCRIPTION OF THE DRAWINGS

Figure 2:
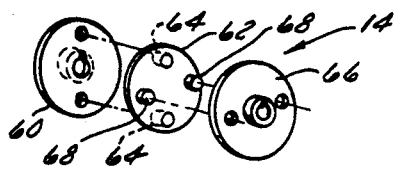
FIG. 2 is an exploded perspective of one of the flexible couplings

Although only one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF THE INVENTION

The soft start coupling 10, according to the invention, is connected to the drive shaft 46 of a drive motor through a flexible coupling 12 and to a drive shaft 70 by a flexible coupling 14. The soft start coupling 10 is designed to provide a smooth transition of torque from the motor to the load. The coupling will accelerate the load from 0 rpm to synchronous rpm with respect to the motor in a linear fashion. The acceleration is controlled regardless of load changes and abrupt load transitions by means of an electronic control circuit assembly 20 which is carried by the coupling 10.

The soft start coupling 10 includes a magnetic particle clutch 16 having a casing 22 connected to the flexible coupling 12 and a disc 24 connected to the flexible coupling 14 by means of a load shaft 26. The disc 24 is connected to the casing 22 by means of metallic particles 36 which are progressively energized by a coil 34 in casing 22. A permanent magnet generator 18 is mounted in the coupling housing 32 which is to be bolted to stationary motor housing. The permanent magnet generator comprises a stator 30 which is attached to housing 32 and a rotor 28 which is carried by the particle brake casing 22. The generator 18 is used to power the electronic control circuit assembly 20 which controls the power flow to the particle brake coil 34.

Although the stator 30 is shown as being connected to a motor housing by bolts 31 it is within the contemplation of the invention to hold the stator 30 in a fixed relation to the rotor 28 by attaching weights to the stator. The weights should be of sufficient mass to prevent rotation of the stator with the rotor. It should also be noted that the rotor 28 could be connected directly to the motor drive shaft 46. The generator 18 is used to power the electronic control circuit assembly 20 in order to energize the particle clutch coil 34. As the coil 34 is energized, the particles 36 will connect the casing 22 to the disc 24 to rotate the load shaft 26.

Figures 3, 4B:
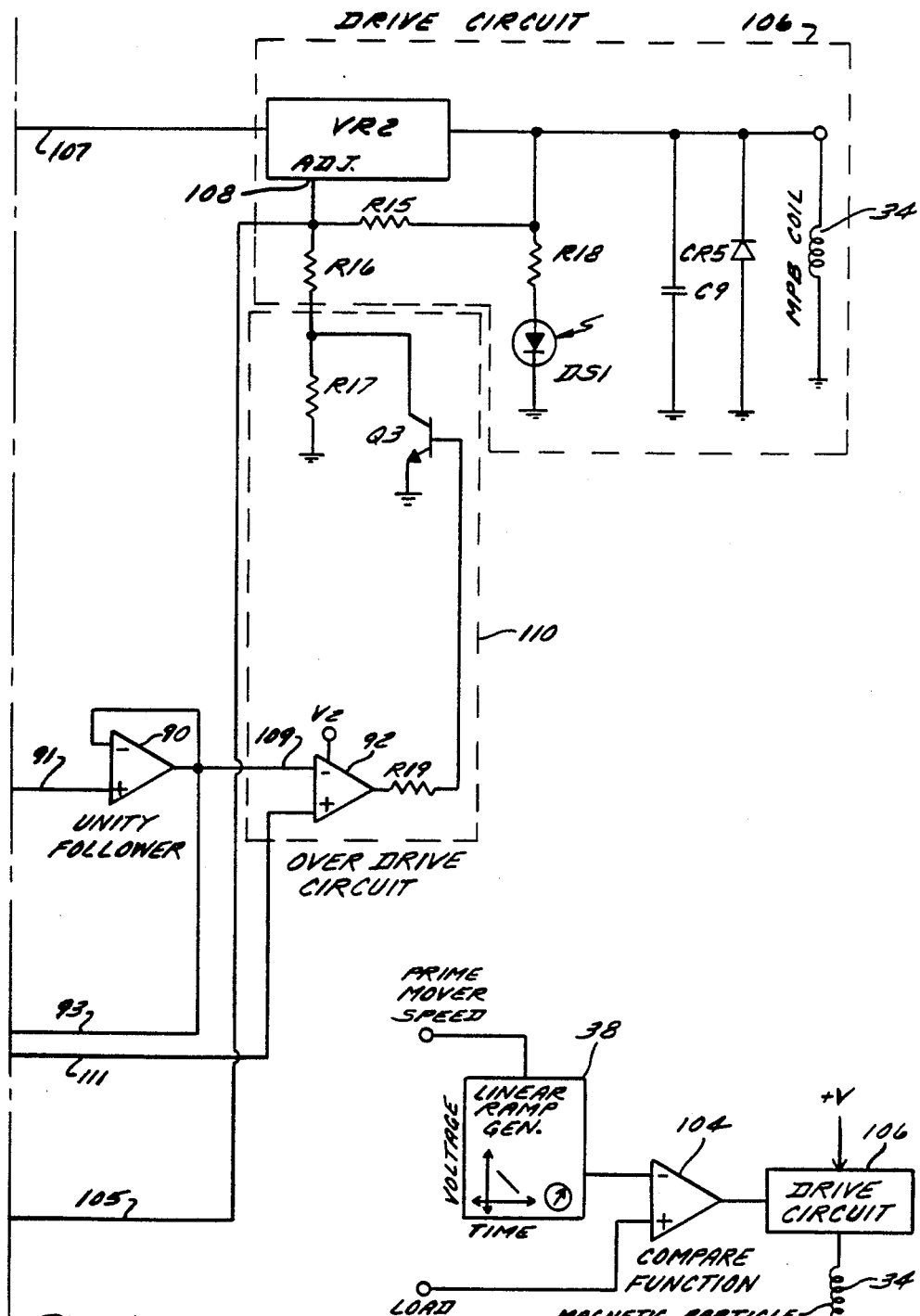
FIG. 3 is a schematic of the control algorithm.
FIG. 4B is a schematic view which completes the electronic control circuit partially shown in FIG. 4A.

The electronic control circuit, as seen in FIG. 3, implements the following control algorithm. The motor speed is monitored by the electronic circuit to generate a reference ramp 38. The level of the ramp is adjusted by the motor speed reference circuit which is a function of the voltage of the generator 18. The control algorithm compares the actual speed of the load shaft 26 to the ramp reference 38 by means of a comparator 104. The resulting pulse width modulated error signal drives the drive circuit 106 for the magnetic brake coil 34.

Figure 1:
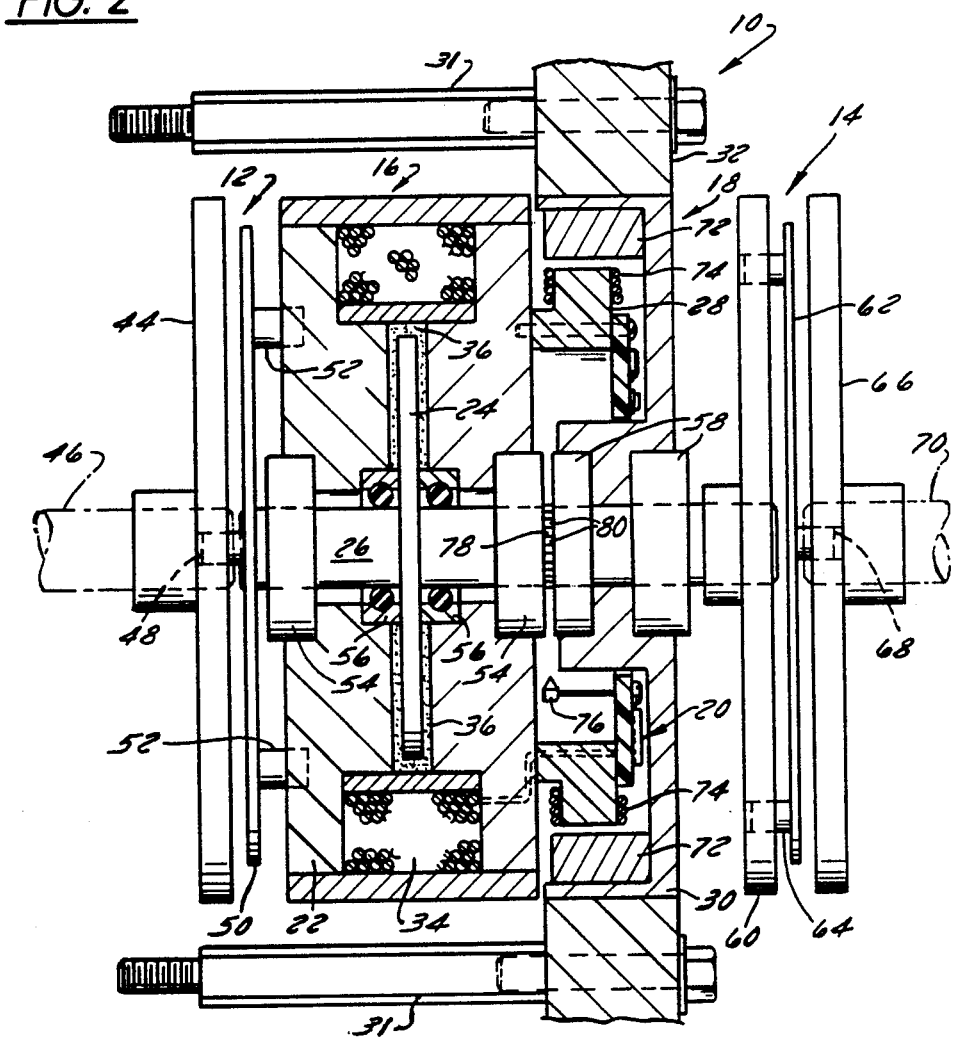
FIG. 1 is a side elevation view, in section, of the soft start coupling.

More particularly and referring to FIG. 1, the flexible coupling 12 includes a drive plate 44 which is connected to the drive shaft 46 of the motor. The drive plate 44 is connected by a pair of screws 48 to a driven flexible plate 50. The plate 50 is connected to the particle clutch casing 22 by means of screws 52. It should be noted that screws 48 are radially offset from screws 52 to balance the coupling.

The particle clutch casing 22 is supported for rotary motion by means of a first pair of outer bearings 54 mounted on the load shaft 26. The particles 36 are sealed in the casing 22 by O-ring seals 56 and annular backing rings 57 provided on each side of disc 24. The load shaft 26 is supported for rotary motion in the stator 30 by means of bearings 58 and is connected to driven plate 60 in the flexible coupling 14. The driven plate 60 is connected to a flexible plate 62 by means of screws 64. The plate 62 is connected to the load drive plate 66 by means of screws 68. The plate 66 is connected to the driven shaft 70.

The permanent magnet generator 18 includes permanent magnets 72 mounted on the stator 30 and a coil 74 mounted on the rotor 28. The coil 74 supplies electric power to the electronic control circuit assembly 20 through wire connections (not shown).

The control circuit assembly 20 is mounted on the generator rotor 28 and includes a Hall effect sensor 76 which is positioned to sense the speed of the load shaft 26 relative to the speed of the rotor 28. This is accomplished by means of a gear 78 provided between bearings 54 and 58. The gear 78 includes twenty-five (25) teeth 80 which are equally spaced around the shaft 26. It should be noted that the Hall effect sensor 76 provides a relative speed signal between the speed of the motor and the speed of the load.

The sequence of operation is as follows: The prime mover or motor comes up to speed unloaded and very fast. The motor is connected to the flexible coupling 12 by the drive shaft 46 to mechanically isolate the coupling 10 from any misalignment between the motor shaft 46 and the load shaft 26. As the motor comes up to synchronous speed, the magnetic particle clutch casing 22 also comes up to speed at the same rate through the connection of the casing 22 to the coupling 12.

As the clutch casing 22 comes up to speed, the generator rotor 28, which is attached to the casing 22, produces an increased output voltage between the coil 74 and the permanent magnets 72 on stator 30. When the motor reaches operating speed, the generator 18 will power the electronic control circuit assembly 20 which is also mounted on the rotor 28 of the generator 18 and, thereby, rotates at the same speed as the prime mover.

Electronic Control Assembly

Figure 4A:
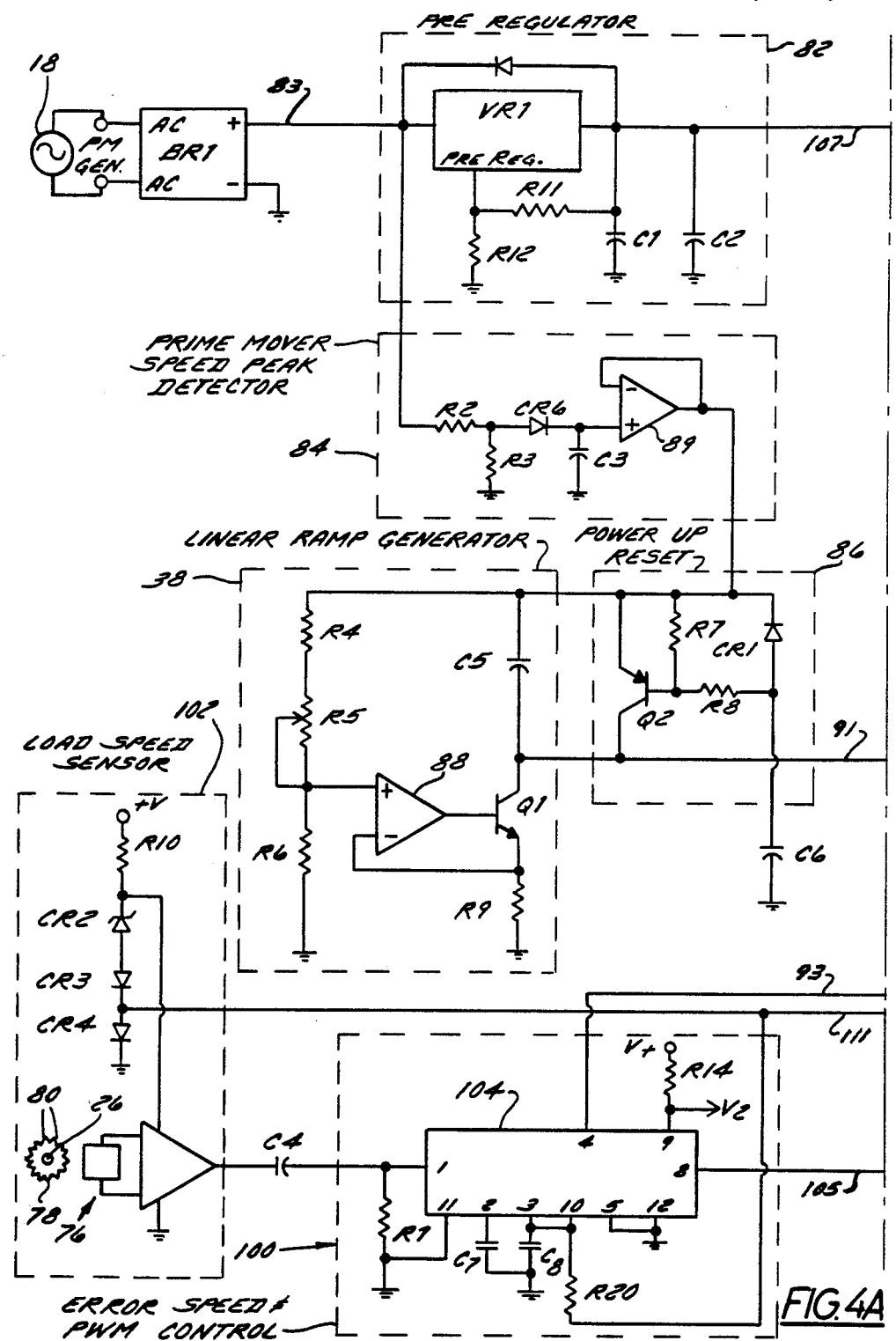
FIG. 4A is a schematic view of one part of the electronic control circuit carried by the soft start coupling.

When the motor shaft 46, magnetic particle clutch casing 22, and generator rotor 28 come up to speed, the voltage generated is presented to the input of a full wave bridge rectifier BR1 which is connected to a pre-regulator 82 through line 83, as seen in FIGS. 4A and 4B. The maximum voltage output of the bridge rectifier will vary depending on generator design and must be higher than the regulated voltage. Means are provided to regulate the maximum voltage output of the bridge rectifier BR1. Such means is in the form of the pre-regulator circuit 82 which limits the output voltage to a maximum of 30 volts DC. The pre-regulator circuit 82 includes a voltage regulator, VR1, having capacitors C1 and C2 connected as power supply filters and resistances R11 and R12 which program the regulator VR1 to 30 volts. The output voltage, 30 volts DC, of the pre-regulator circuit 82 is sent to the voltage regulator VR2 in drive circuit 106 through line 107.

The speed of the motor shaft 46 is detected by means of a sample peak hold circuit 84 which readjusts the voltage level of the linear ramp generator circuit 38. The hold circuit 84 is used to store the peak generator voltage which is proportional to the motor speed. Resistances R2 and R3 formulate a voltage divider for scaling. Capacitor C3 and diode CR-6 comprise the peak hold circuit. A high impedance input of a unity follower 89 is used to buffer the peak hold circuit from the rest of the circuitry.

The linear ramp generator circuit 38 is based on the relation of a stored charge on a capacitor C5 with respect to time and voltage, T=CE/A wherein T=time;

C=capacitor;

E=voltage across the capacitor; and

A=current in the capacitor.

A precision voltage to current converter is used to make the time dependent acceleration ramp. To initialize the ramp circuit, a power up reset circuit 86 discharges the timing capacitor C5 to the peak detector circuit 84 via resistor divider R7 and R8 and a discharge capacitor C6 (initial condition of the capacitor). When Q2 discharges C5, the prime mover speed voltage is then seen at the collector of transistor Q2. The ramp occurs by the prime mover speed signal level decreasing in voltage from its initial condition (determined by the prime mover speed peak detector) to 0 volts, whereby the time is governed by current through the transistor Q1 as it acts on capacitor C5.

Ramp time is established by the current in resistance R9 which is mirrored in capacitor C5 through Q1. The current sink consists of transistor Q1, low off-set operational amplifier 88 and sensing resistor R9. The level of current is established by the resistor divider formed by resistances R4 and R6 and variable control potentiometer R5. The potentiometer R5 is used to adjust the acceleration time period. The timing capacitor C5 and voltage divider R4, R5, and R6, are connected to the prime mover speed circuit 84 to provide consistent acceleration from zero to synchronous speed of the motor or prime mover. Adjusting the control potentiometer R5 changes the charge current and thus the acceleration time. An operational amplifier 90 which is connected to the ramp generator circuit 38 by line 91 is configured as a unity follower and is used to provide a low impedance speed signal to the comparator 100 through lines 93. The ramp generator circuit has been described in connection with a linear timed acceleration control of load speed. However, it should be noted that the circuit can be used for non-linear timed acceleration if desired.

The load speed relative to motor speed is sensed by means of a circuit 102 consisting of a magnetically biased Hall Effect Sensor 76 which monitors the speed of the teeth 80 on gear 78 which is mounted on the load shaft 26. A precision voltage supply for the Hall Effect Sensor 76 is set up by means of resistance R10, and diodes CR2, CR3, and CR4. The voltage drop across diode CR4 is used as the 0 speed reference voltage. The output of the load speed sensing circuit 102 goes to the error speed and PWM control circuit 100 to produce a pulse width modulated error signal proportional to load shaft speed. A frequency to voltage converter 104 compares the load shaft speed (pin 1) to the ramp speed reference signal (pin 4) to produce a pulse width modulated error signal based on a frequency conversion ripple. The frequency (pin 8) to voltage converter 104 is scaled to 3 volts per 1800 rpm by capacitor C7 and resistor R20. The voltage converter 104 output at pin 3 is applied to the internal error amplifier in the converter 104 which is compared to the linear ramp signal at pin 4. The pulse width modulated, PWM, signal at pin 8 is sent to the drive circuit 106 through line 105. The PWM signal occurs by purposely under filtering the output of the frequency to voltage converter 104 which is scaled by capacitor C8. This ripple is used to provide a quasi-pulse width modulated output to the drive circuit 106. The amount of ripple controls the system gain and response.

The drive circuit 106 consists of a programmable regulator VR2 which reduces the voltage to 24 volts. The regulator is used as a source of switched voltage to drive the particle clutch coil 34 under command of the PWM control circuit. The PWM output signal controls the adjustment pin 108 of the voltage regulator VR2 by switching the output ON and OFF. A control network is formed by resistances R15, R16, and R17 to set the output voltage on regulator VR2 via the adjustment pin 108. The programmable regulator VR2 is mounted on the generator rotor 28 and also provides means for thermal shut down in the event of magnetic particle clutch overheating and overload. The regulator VR2 is mounted on the generator rotor 28 and senses the heat of the rotor as well as the clutch casing 30.

During the starting sequence, the drive circuit 106 modulates the voltage from the pre-regulator circuit 82 to the particle clutch coil 34. After the load is up to speed, means are provided for cutting the voltage of the drive circuit 106 from the 30 volt to 12 volt dc operation. Such means is in the form of an overdrive circuit 110 which consists of a high gain operational amplifier 92 that is connected to unit follower 90 by line 109 and to diode CR4 by line 111. The amplifier 92 compares the voltage signal from the linear ramp generator 38 through amplifier 92 with the voltage signal from the diode CR4. The output of the amplifier 92 turns on transistor Q3 thus switching the voltage regulator VR2 to 12 volt operation. This reduces the long term heating effect of the magnetic particle clutch coil 34. It also provides a means of providing a torque transfer boost during the starting period when the coil 34 is under 24 volt operation. Capacitor C9 is a high frequency filter to prevent any oscillations in the output of voltage regulator VR2. The back EMF generated when the magnetic particle clutch coil 34 is pulsed is dissipated by means of diode CR5. The switching status of the voltage regulator VR2 is indicated by means of a Display Service LED DS1.

Thus, it should be apparent that there has been provided, in accordance with the present invention, a soft start coupling that freely satisfies the aims and advantages set forth above. Although the invention has been described in connection with a motor actuated self-powered motor circuit assembly for connecting a coupler to a load, it is within the contemplation of this invention to employ the self-powered concept in connection with the actuation of various prime mover actuated electrically controlled devices. In this regard, the generator and electronic control circuit assembly can be carried by the rotary parts of the prime mover to provide power to various electronic devices associated with the operation of a prime mover driven load. Accordingly, it is intended to embrace all such alternatives, modifications, and variations as fall within the spirit and broad scope of the appended claims.

We claim:

1. A soft start coupling device for connecting a drive motor to a load, said coupling device comprising:
   a magnetic particle clutch operatively connected to the drive motor and the load;
   an electronic control circuit assembly carried by said magnetic particle clutch; and
   a generator operatively connected to said magnetic particle clutch and to said electronic control circuit assembly, said assembly including means responsive to the generation of power from said generator for energizing said magnetic particle clutch to connect the motor to the load, said assembly including means for progressively actuating said energizing means to provide linear timed acceleration of the load.

2. The coupling device according to claim 1 wherein said circuit assembly includes means for energizing said clutch when the motor is rotating at synchronous speed.

3. The coupling device according to claim 2 wherein said assembly includes means for sensing the heat of the clutch to provide thermal shut down of said device on overheating said clutch.

4. The coupling according to claim 1 wherein said magnetic particle clutch includes a casing connected to rotate with the motor and a disc connected to drive said load, said generator includes a stationary stator and a rotor connected to rotate with said casing, said electronic control assembly being carried by said generator rotor.

5. The coupling according to claim 4 wherein said control assembly includes means connected to said casing which is responsive to overheating of said clutch for providing thermal shut down of said central assembly.

6. A soft start coupling for connecting a motor shaft to a load, said coupling comprising:
  a generator having a rotor and a stator having a permanent magnet;
  a load shaft mounted for rotary motion in said stator;
  a magnetic particle clutch mounted on said load shaft;
  said clutch including a casing mounted to said motor shaft for rotary motion relative to said load shaft, a disc secured to said load shaft for rotation within said casing, magnetic particle means for selectively connecting said casing to said disc;
  said generator rotor being mounted to rotate with said casing within said stator, said generator rotor including a coil for energizing said magnetic particle means to connect said disc to said casing; and
  an electronic control circuit assembly mounted on said rotor and being operatively connected to said rotor and to said clutch whereby the voltage generated by said generator will power said electronic control circuit assembly to energize said magnetic particle means, said control assembly includes means for providing linear timed acceleration of said load shaft up to the speed of the motor.

7. The combination of a drive motor, a driven load and a coupling operatively connecting said drive motor to said driven load, said coupling including:
  a first means for generating a voltage signal when said drive motor is operating at synchronous motor speed;
  a second means for generating a signal corresponding to load speed; and
  a third means for coordinating said synchronous motor speed signal and said load speed signal to provide a controlled acceleration of said load speed up to synchronous motor speed.

8. The coupling according to claim 7 wherein said coordinating means includes means for generating a reference ramp to provide linear timed acceleration of the load speed up to motor speed.

9. The combination according to claim 7 wherein said coupling means includes a magnetic clutch having a casing connected to rotate with said motor, a disc connected to rotate with said load, and magnetic particle means in said casing for connecting said rotor to said disc.

10. The combination according to claim 7 wherein said first means comprises a generator carried by the motor, and said third means comprises an electronic control assembly carried by said generator, said control assembly being operatively connected to said generator and to said coupling whereby said generator will power said coupling to drive said load.

11. In combination with a prime mover, and a load device, the improvement comprising an electrically powered clutch for connecting the prime mover to the load device, said clutch including a casing and a disc, a generator having a rotor mounted on said casing and a stator mounted on the prime mover; and
  a control circuit mounted on said generator rotor, said control circuit including a time controlled acceleration circuit and being electrically connected to said generator and to said clutch, whereby said clutch is activated whenever the control circuit is powered by said generator.

12. The combination according to claim 11 wherein said control circuit includes means for coordinating the speed of the prime mover with the speed of operation of the load device.

13. The combination according to claim 12 wherein said control circuit includes coordinating means for generating a reference ramp to provide a linear timed control signal to the load device.

14. The coupling according to claim 11 wherein said control circuit includes means connected to said casing for thermally sensing clutch overload to shut down said control circuit.

* * * * *